US009457469B2

(12) United States Patent
Hazan et al.

(10) Patent No.: US 9,457,469 B2
(45) Date of Patent: Oct. 4, 2016

(54) METHOD AND APPARATUS FOR AUTOMATIC AND EFFICIENT LOCATION GENERATION FOR COOPERATIVE MOTION

(71) Applicant: Siemens Industry Software Ltd., Airport City (IL)

(72) Inventors: Moshe Hazan, Elad (IL); Lisandro Embon, Petah Tikva (IL); Rahav Madvil, Rishon Lezion (IL)

(73) Assignee: Siemens Industry Software Ltd., Airport City (IL)

( * ) Notice: Subject to any disclaimer, the term of this patent is extended or adjusted under 35 U.S.C. 154(b) by 110 days.

(21) Appl. No.: 14/459,800

(22) Filed: Aug. 14, 2014

(65) Prior Publication Data

US 2016/0046022 A1      Feb. 18, 2016

(51) Int. Cl.
G06F 19/00      (2011.01)
B25J 9/16      (2006.01)
B25J 3/00      (2006.01)

(52) U.S. Cl.
CPC ............... B25J 9/1671 (2013.01); B25J 3/00 (2013.01); B25J 9/1664 (2013.01); B25J 9/1666 (2013.01); B25J 9/1682 (2013.01); G05B 2219/39139 (2013.01); G05B 2219/39141 (2013.01)

(58) Field of Classification Search
CPC .... B25J 9/1682; B25J 9/1671; B25J 9/1664; B25J 9/1666; B25J 3/00; G05B 2219/33097; G05B 2219/39101; G05B 2219/39136; G05B 2219/39141; G05B 2219/40399; A61B 2019/2223
USPC ............... 700/245, 253, 255, 256, 248, 262; 901/1, 8, 15, 29
See application file for complete search history.

(56) References Cited

U.S. PATENT DOCUMENTS 5,784,542 A * 7/1998 Ohm ..................... B25J 3/04
700/247
6,004,016 A * 12/1999 Spector .................. B25J 9/1666
700/247

(Continued)

FOREIGN PATENT DOCUMENTS

DE    102008027475 A1    12/2009
DE    102010052253 A1    5/2012

(Continued)

OTHER PUBLICATIONS

Ahuactzin, J., et al., "Using Genetic Algorithms for Robot Motion Planning," Proceedings of the 10th European Conference on Artificial Intelligence, 1992, 5 pages.

(Continued)

*Primary Examiner* — Khoi Tran
*Assistant Examiner* — Jorge Peche (57) ABSTRACT

Methods for automatic and efficient location generation for cooperative motion. A method includes receiving a cooperative operation comprising a master operation and the slave operation, simulating the slave operation to obtain a slave duration between consecutive slave locations and a trajectory time to perform the slave operation, populating a plurality of potential locations along the master trajectory, generating a plurality of candidate operations in a population, for each of the plurality of candidate operations in the population, simulating a candidate operation with the slave operation to calculate an efficiency factor to perform the candidate operation and removing the candidate operation from the population when the efficiency factor is not better compared to other candidate operations in the population and returning the candidate operation remaining in the population.

20 Claims, 4 Drawing Sheets

(56) References Cited

U.S. PATENT DOCUMENTS

| | | | |
|---|---|---|---|
| 6,216,058 B1* | 4/2001 | Hosek | B25J 9/1664 318/568.21 |
| 6,493,607 B1* | 12/2002 | Bourne | B25J 9/1666 414/744.3 |
| 6,728,599 B2* | 4/2004 | Wang | A61B 34/77 128/897 |
| 7,298,385 B2 | 11/2007 | Kazi et al. | |
| 7,386,365 B2* | 6/2008 | Nixon | B25J 9/1692 606/139 |
| 8,401,698 B2* | 3/2013 | Kamrani | B25J 9/1661 700/173 |
| 8,620,473 B2* | 12/2013 | Diolaiti | A61B 1/00087 600/407 |
| 2004/0111183 A1* | 6/2004 | Sutherland | A61B 19/22 700/245 |
| 2005/0055132 A1* | 3/2005 | Matsumoto | B25J 9/1682 700/245 |
| 2005/0137648 A1* | 6/2005 | Cosendai | A61B 5/0031 607/48 |
| 2005/0197680 A1* | 9/2005 | DelMain | A61B 5/07 607/60 |
| 2006/0025890 A1* | 2/2006 | Nagatsuka | B25J 9/1671 700/253 |
| 2006/0145647 A1* | 7/2006 | Kitatsuji | B25J 9/1682 318/568.11 |
| 2006/0217841 A1* | 9/2006 | Matsumoto | B25J 9/1669 700/248 |
| 2006/0287769 A1* | 12/2006 | Yanagita | B25J 9/1669 700/245 |
| 2008/0009971 A1* | 1/2008 | Kim | B62D 57/032 700/245 |
| 2008/0306628 A1* | 12/2008 | Ng-Thow-Hing | B25J 9/1664 700/245 |
| 2009/0105880 A1* | 4/2009 | Okazaki | B25J 9/1633 700/258 |
| 2010/0224022 A1* | 9/2010 | Choi | A61B 34/73 74/490.01 |
| 2010/0305751 A1* | 12/2010 | Nagatsuka | B25J 9/1671 700/245 |
| 2011/0153080 A1* | 6/2011 | Shapiro | B25J 9/1666 700/255 |
| 2012/0158174 A1* | 6/2012 | Moon | G06N 3/008 700/245 |
| 2012/0165982 A1* | 6/2012 | Kim | B25J 9/162 700/255 |
| 2012/0290131 A1* | 11/2012 | Khoukhi | B25J 9/1623 700/250 |
| 2013/0030569 A1* | 1/2013 | Fudaba | G05B 19/423 700/245 |
| 2014/0005804 A1* | 1/2014 | Brand | G05B 19/31 700/63 |
| 2014/0156068 A1* | 6/2014 | Graca | B25J 9/1666 700/248 |
| 2014/0163736 A1 | 6/2014 | Azizian et al. | |
| 2014/0207837 A1* | 7/2014 | Taniguchi | G06N 5/02 708/207 |
| 2015/0148952 A1* | 5/2015 | Shiratsuchi | B25J 9/1682 700/248 |
| 2015/0177194 A1* | 6/2015 | Xu | G01N 29/043 73/641 |

FOREIGN PATENT DOCUMENTS

| | | |
|---|---|---|
| EP | 1090723 A2 | 4/2001 |
| EP | 2157490 A1 | 2/2010 |
| EP | 2485875 B1 | 4/2013 |
| JP | 2004243461 A | 9/2004 |
| JP | 2006192554 A | 7/2006 |
| WO | 2005049284 A1 | 6/2005 |
| WO | 2005124486 A2 | 12/2005 |
| WO | 2011042293 A1 | 4/2011 |
| WO | 2014052286 A1 | 4/2014 |

OTHER PUBLICATIONS

Bernhardt, R., et al., "Development of Virtual Robot Controllers and Future Trends," 6th IFAC Symposium on Cost Oriented Automation, Berlin, Germany, Oct. 8-9, 2001, 7 pages.

Bernhardt, R., "Von Realistischer Roboter Simulation Zu Virtuellen Steuerungen," ZWF, Zeitschrift fur Wirtschaftlichen Fabrikbetrieb, 2000, Munich, Apr. 2-4, 2011, 5 pages. ( No translation).

Bernhart, R., et al., "Realistic Robot Simulation in Concurrent Engineering of Manufacturing Lines in Automative Industries," Eight ISPE International Conference on Concurrent Engineering : Research and Applications, Jul. 29-Aug. 1, 2002, 5 pages.

Bernhardt, R., et al., "The Virtual Robot Controller (VRC) Interface," ISATA 2000, Automation and Transportation Technology Simulation and Virtual Reality, Dublin Ireland, Sep. 25-27, 2000, 6 pages.

Bernhardt, R., et al., "Virtual Robot Controller (VRC) Interface," Robotik, 2000, 7 pages. ( No Translation).

Bernhart, R., et al., "Virtual Robot Controllers as Simulation Agents," 2nd Workshop on Agent Based Simulation, ISBN 1-56555-215-6, Passau, Germany, Apr. 2-4, 2001, 6 pages.

Bohlin, R., et al., "Path Planning Using Lazy PRM," Proceedings of the 2000 IEEE International Conference on Robotics and Automation, San Francisco, CA, USA, Apr. 2000, pp. 521-528.

Chen, P., et al. "SANDROS: A Motion Planner with Performance Proportional to Task Difficulty," Proceedings of the 1992 IEEE International Conference on Robotics and Automation, Nice, France, May 1992, 8 Pages.

Faverjon, B., et al., "The Mixed Approach for Motion Planning: Learning Global Strategies from a Local Planner," Proceedings of the International Joint Conference on Artifical Intelligence, Jan. 1, 1987, 7 pages.

Gueta, L., et al., "Compact Design of Work Cell with Robot Arm and Positioning Table Under a Task Completion Time Constraint," 2009 IEEE/RSJ International Conference on Intelligent Robots and Systems, St. Louis, MS, USA, Oct. 11-15, 2009, 7 pages.

Gueta, L., et al., "Practical Point-to-Point Multiple-Goal Task Realization in a Robot Arm with a Rotating Table," Advanced Robotics, vol. 25, No. 6-7, 2011, pp. 717-738.

Hein, B., et al., "Automated Generated Collision-Free Time Optimized Robot Movements in Industrial Environments Based on Rounding," Proceedings of the 4th IEEE International Symposium on Assembly and Task Planning, Furuoka, Japan, May 28-29, 2001, pp. 110-115.

Hirakawa, A., "Trajectory Generation for Redundant Manipulators Under Optimization of Consumed Electrical Energy," Conference Record of the 1996 IEEE Industry Applications Conference—31st IAS Annual Meeting, IEEE Service Center, US, vol. 6, Oct. 6, 1996, XP010201236.

Hwang, Y,. et al., "Optimizing Robot Placement for Visit-Point Tasks" Proceedings of the AI and Manufacturing Research Planning Workshop, Albuquerque, NM, USA, Jun. 1996, 7 pages.

"Realistic Robot Simulation (RRS)," www.realistic-robot-simulation.org, Fraunhofer IPK, 2009, Retrieved Jul. 26, 2014, 4 pages.

Sanchez, G., et al, "Locally-Optimal Path Planning by Using Probabilistic Roadmaps and Simulated Annealing," Proceedings of IASTED International Conference on Robotics and Applicatiions, Oct. 1999, 6 pages.

Skiena, S., "Weighted Graph Algorithms," The Algorithm Design Manual, 2nd Ed., Chapter 6, London, England, Aug. 2008, 39 pages.

Tian, L., et al., "An Effective Robot Trajectory Planning Method Using a Genetic Algorithm," Mechatronics, vol. 14, 2004, pp. 455-470.

Willnow, C., et al., "Virtual Time Management of Virtual Robot Controllers," Modeling and Simulation 2001, 15th European Simulation Multiconference 2001, ESM' 2001, Jun. 6-9, 2001, Prague, Czech Republic, 8 pages.

Yue, S., et al., "Point-to-Point Trajectory Planning of Flexible Redundant Robot Manipulators Using Genetic Algorithms," to appeal in Robotica, Trajectory Planning of FRM, Jul. 17, 2001, pp. 1-24.

Foreign Communication From a Related Counterpart Application, PCT Application No. PCT/US2013/061340, International Search Report dated Jan. 31, 2014, 6 pages.

(56) References Cited

OTHER PUBLICATIONS

Foreign Communication From a Related Counterpart Application, PCT Application No. PCT/US2014/021801, International Search Report dated Sep. 3, 2014, 5 pages.
U.S. Appl. No. 14/448,416, Non-Final Office Action dated Aug. 25, 2015, 9 pages.
U.S. Appl. No. 14/197,620, Final Office Action dated Jul. 31, 2015, 16 pages.
Cao, Bailin et al. "Practical Implementation of Time-efficient Trajectory Planning for Two Cooperative Industrial Robot Arms", Proceedings of the 1996 IEEE/RSJ International Conference on Robots and Systems (IROS). Robotic Intelligence Interacting with Synamic Worlds, Osaka, Nov. 4-8, 1996, XP000771580, ISBN: 978-0-7803-3214-0, 8 pages.
Wang, Fei-Yue et al. "Planning Time-Optimal Trajectory for Coordinated Robot Arms", Proceedings of the International Conference on Robotics and Automation Atlanta, May 2-6, 1993, Los Alamitos, IEEE Comp. Soc. Press, US, vol. Conf. 10, May 2, 1993, XP010095120, ISBN; 978-0-8186-3450-5, 6 pages.
Baba N. et al: "Collision avoidance planning of a robot manipulator by using genetic algorithm—A consideration for the problem in which moving obstacles and/or several robots are included in the workspace"; Evolutionary Computation, 1994; IEEE World Congress on Computational Intelligence; First IEEE Conference Orlando, FL USA Jun. 27-29, 1994; XP010122796; ISBN: 978-0-7803-1899-1, 6 pages.
EP Search Report dated Feb. 1, 2016, for EP Application No. 15179505.1, 7 pages.
Gasparetto et al. "Trajectory Planning in Robotics," Mathematics in Computer Science, vol. 6, No. 3, Aug. 30, 2012, pp. 269-279, XP035125437, 11 pages.
Vergnano, Alberto et al. "Modeling and Optimization of Energy Consumption in Cooperative Multi-Robot Systems" IEEE Transactions on Automation Science and Engineering, vol. 9. No. 2, Apr. 2012, 6 pages.
Diaz, Nancy et al. "Cost and Energy Consumption Optimization of Product Manufacture in a Flexible Manufacturing System" Laboratory for Manufacturing and Sustainability, University of California at Berkeley, USA, 8 pages.

* cited by examiner

METHOD AND APPARATUS FOR AUTOMATIC AND EFFICIENT LOCATION GENERATION FOR COOPERATIVE MOTION

TECHNICAL FIELD

The present disclosure is directed, in general, to automated industrial operations and robotics, and in particular to methods and systems for automatic and efficient location generation for cooperative motion.

BACKGROUND OF THE DISCLOSURE

Product data management (PDM) systems manage product lifecycle management (PLM) systems and other data. Improved systems are desirable.

SUMMARY OF THE DISCLOSURE

Various disclosed embodiments include a method for automatic and efficient location generation for cooperative motion. The method includes receiving a cooperative operation comprising a master operation and a slave operation, simulating the slave operation to obtain a slave duration between consecutive slave locations and a trajectory time to perform the slave operation, populating a plurality of potential locations along the master trajectory, generating a plurality of candidate operations in a population, for each of the plurality of candidate operations in the population, simulating a candidate operation with the slave operation to calculate an efficiency factor to perform the candidate operation and removing the candidate operation from the population when the efficiency factor is not better compared to other candidate operations in the population and returning the candidate operation remaining in the population.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The industry is progressing to more complex and more demanding task resulting in using more robots and automation, with some operations requiring use of multiple robots in coordination.

Cooperative robots work in sets with one designated as a master robot and the remaining designated as slave robots. Typical operation of cooperative robots uses the master robot to hold or handle the component of the cooperative operation and the slave robots perform actions such as gluing, welding, cutting, drilling, etc.

A master robot usually holds a start location and an end location for the master robot to reach, while the slave robot holds many more locations dealing with task needed to complete the cooperative operation. The cooperative motion requires an equal number of tasks on the master operation as the number of tasks on the slave operations.

Robots can be heavy power consumers. Robots work repeatedly on one or more tasks for long hours and have complex powertrains that can include engines, transmissions, and so on. In a typical production line, there can be many robots, which further amplifies these issues.

Embodiments according to the disclosure find the most efficient or optimal robot cooperative operation based on given constraints and in terms of energy consumption and motion time. The energy to time correlation can include ratings and rankings of the results of simulations that generate power or energy consumption and motion time.

Applying this approach on every robot in a production line reduces the energy consumption and task cycle time resulting in reduced production costs. The reduced production costs come from finding optimal cooperative operation between a master robot and at least one slave robot in the production line to reduce overall energy consumption and cycle time.

Figure 1:
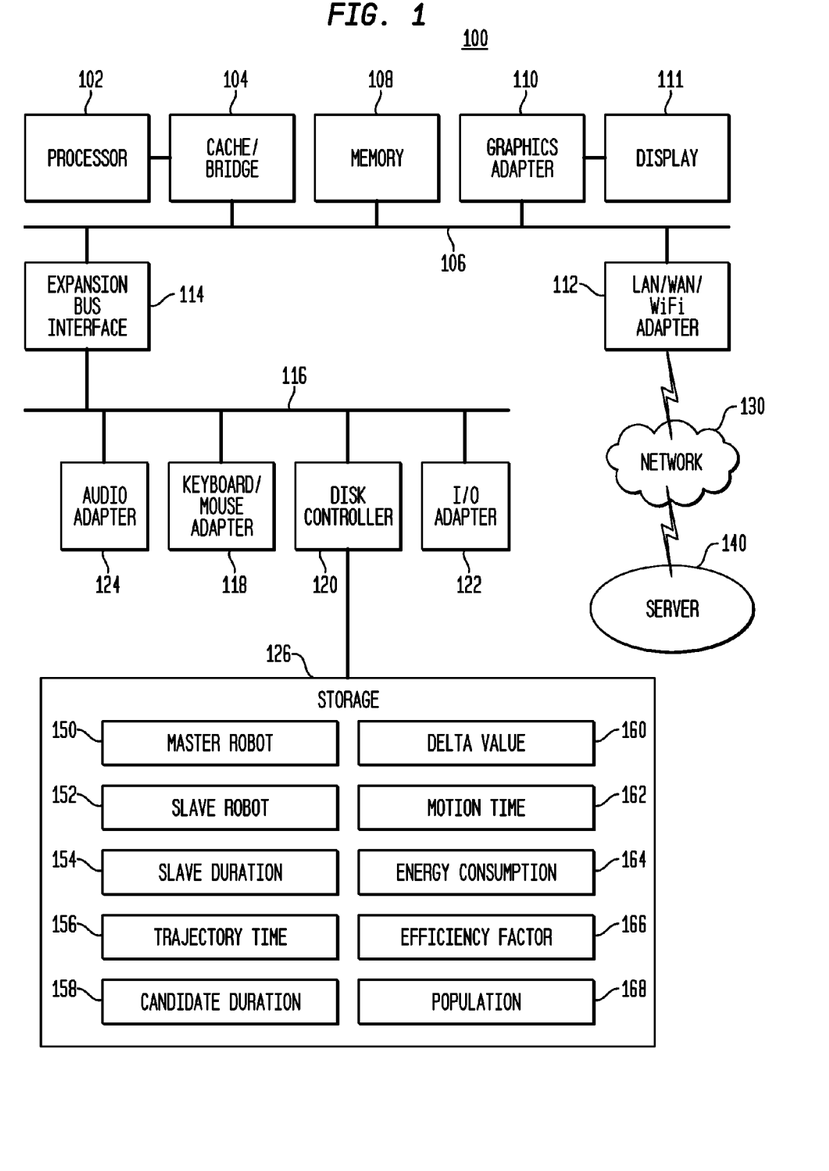
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the master robot 150, the slave robot 152, the slave duration 154, the trajectory time 156, the candidate duration 158, the delta value 160, the motion time 162, the energy consumption 164, the efficiency factor 166, the population 168, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
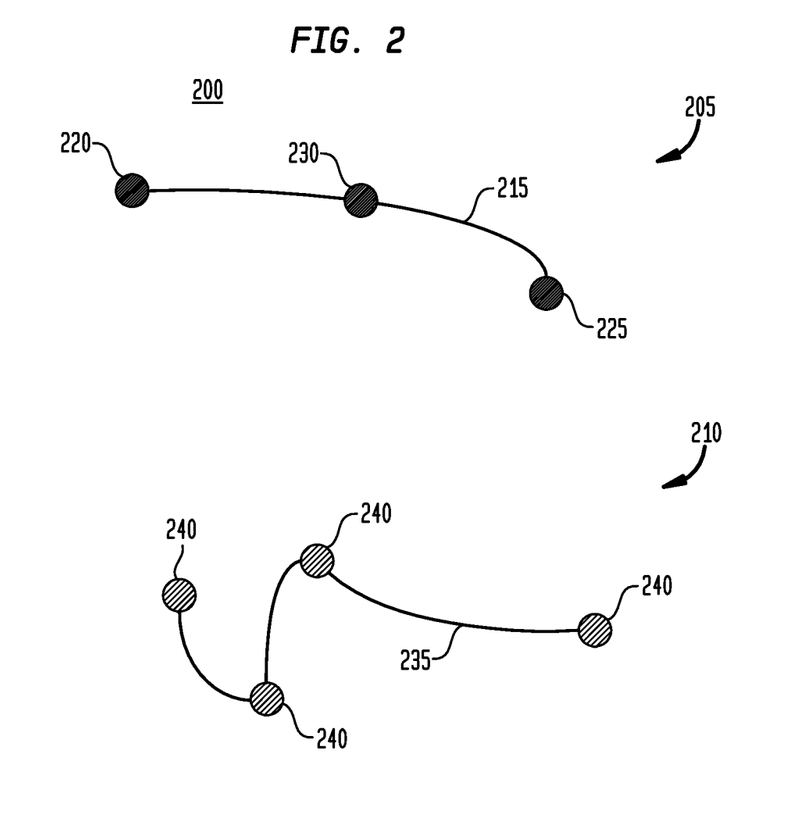
FIG. 2 illustrates a cooperative operation of a master robot and a slave robot in accordance with disclosed embodiments.

FIG. 2 illustrates a cooperative operation 200 of a master robot 150 and a slave robot 152 in accordance with disclosed embodiments.

The cooperative operation 200 represents the master operation 205 of the master robot 150 and a slave operation 210 of the slave robot 152. The master operation 205 includes a master trajectory 215, a start location 220 and an end location 225. In certain embodiments, the master operation 205 also includes one or more master locations 230. The master operation 205 is the operation of tasks completed by the master robot 150. The master trajectory 215 is the path which the tool frame center point (TFCP) of the master robot 150 follows for the master operation 205. The master trajectory 215 is optimized and cannot be altered. The start location 220 is the beginning of the master trajectory 215 and start of the motion time 162. The motion time 162 measures the amount of time for the entire cooperative operation 200, which is also the total time of the master operation 205. The end location 225 is the end of the master trajectory 215 and motion time 162. All master locations 230, including the start location 220 and the end location 225, are on the master trajectory 215. The master locations 230 are locations on the master trajectory 215 where the master robot 150 completes a task. The master robot 150 pauses at the master locations 230 an amount of time required to complete the respective tasks.

The slave operation 210 includes a slave trajectory 235 and a plurality of slave locations 240. In certain embodiments, the cooperative operation 200 includes more than one slave operation 210. The slave trajectory 235 is the path with the TFCP of the slave robot 152 follows for the slave operation 210. The slave trajectory 235 is optimized and cannot be altered. The plurality of slave locations 240 are locations on the slave trajectory 235 where the slave robot 152 completes a task. The slave robot 152 pauses at the slave locations 240 to simulate an amount of time and energy to complete the task. The slave duration 154 is the amount of time for the slave robot 152 to move between consecutive slave locations 240. The trajectory time 156 is the summation of slave durations 154 or the total amount of time the slave robot 152 takes to complete the slave operation 210.

Figure 3:
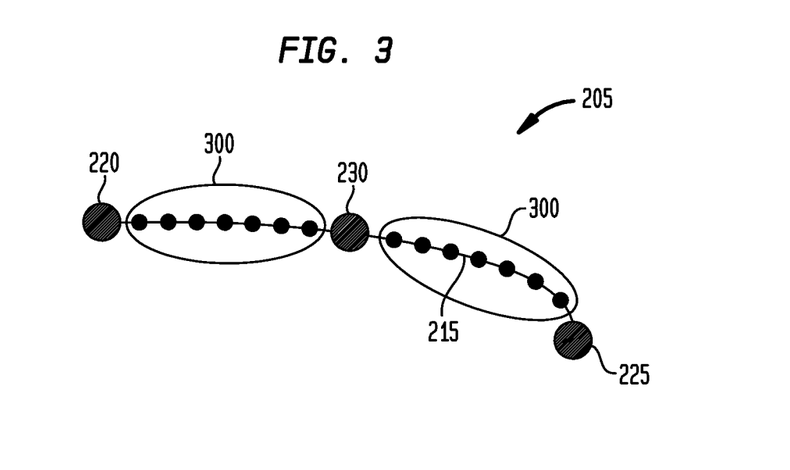
FIG. 3 illustrates a master operation with a plurality of potential locations in accordance with disclosed embodiments.

FIG. 3 illustrates a master operation 205 with a plurality of potential locations 300 in accordance with disclosed embodiments.

In order to balance motion time 162 and energy consumption 164 with processing time to determine the optimal locations, a plurality of potential locations 300 are added to the master trajectory 215 in locations to test a number of added master locations 230 equal to the number of locations on the slave trajectory. A higher number of potential locations 300 will calculate a more accurate optimal motion time 162 and energy consumption 164, while a lesser number of potential locations 300 will decrease the number of processing time to determine the optimal master operation 205. The delta value 160 defines the spacing of the potential locations 300. The delta value 160 can be based on a number of factors, such as a percentage, the number of potential locations 300, defined by the cooperative operation 200 or a user, or any other suitable method for determining the delta value 160.

Figure 4:
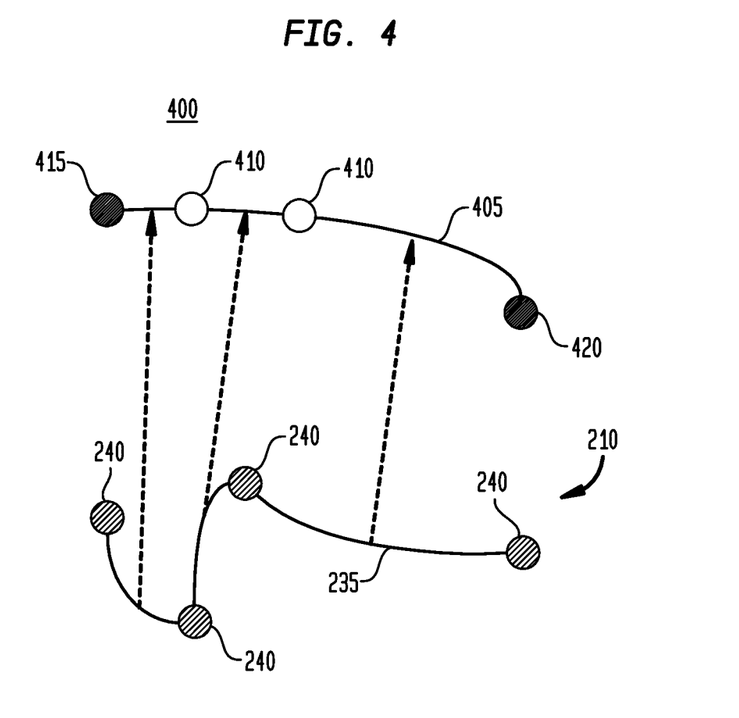
FIG. 4 illustrates a candidate operation of a master robot and a slave robot in accordance with disclosed embodiments

FIG. 4 illustrates a candidate operation 400 of a master robot 150 and a slave robot 152 in accordance with disclosed embodiments.

The candidate operation 400 includes a candidate trajectory 405, a plurality of candidate locations 410, and the slave operations 210. The candidate trajectory 405 is a duplicate of the master trajectory. Because the master trajectory cannot be altered, the candidate trajectory 405 cannot be altered either. The number of candidate locations 410 equals the total number of slave locations 240 for all the slave operations 210. The candidate locations 410 are located on the candidate trajectory 405 at potential locations. A candidate operation 400 is generated for each combination of candidate locations 410 at potential locations. A first candidate location 415 is placed on the candidate trajectory 405 respective to the start location of the master operation and a last candidate location 420 is placed on the candidate trajectory 405 respective to the end location of the master operation. Any master locations on the master trajectory have respective candidate locations 410 on the candidate trajectory 405.

A plurality of candidate operations 400 is stored in a population 168. The candidate operation 400 is simulated to calculate an efficiency factor 166. The efficiency factor 166 is based on motion time 162 and energy consumption 164. The motion time 162 and the energy consumption 164 are measured based on completing the candidate operation 400. The candidate operations 400 can be removed from the population 168 when a simulation of the candidate operation 400 determines that the efficiency factor 166 is not better than the efficiency factor 166 of any candidate operation 400 in the population 168. A candidate operation 400 can also be removed from the population 168 when a collision is detected between the master robot 150 and any of the slave robots 152.

The candidate duration 158 is measured between consecutive candidate locations 410. When the candidate duration 158 between consecutive candidate locations 410 exceeds the slave duration 154 between respective slave locations 240, the candidate operation 400 is removed from the population 168.

Different methods are used for selecting the order to simulate candidate operations 400. The system simulates the candidate operations 400 in the order which the candidate operations 400 are generated. In certain embodiment, the candidate operation simulated is based on candidate locations 410 placed at potential locations 300 spaced where the percentage of the candidate durations 158 to the motion time 162 is equal to the percentage of the slave duration 154 to the trajectory time 156.

Figure 5:
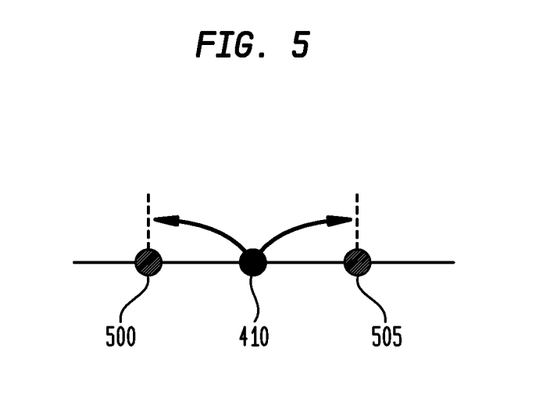
FIG. 5 illustrates a previous location and following location for simulating candidate operations in accordance with disclosed embodiments.

FIG. 5 illustrates a previous location 500 and following location 505 for simulating candidate operations in accordance with disclosed embodiments.

Once a candidate operation is simulated, the system tests a candidate operation with a candidate location 410 at a following location 505. When a candidate operation is simulated and the calculated efficiency factor 166 is less than the first simulated candidate operation, all of the candidate operations which have respective candidate locations 410 at following locations 505 are removed from the population 168. In an embodiment where the first simulated candidate operation does not have the candidate locations 410 at the first potential locations, the system simulates a previous location 500. When a candidate operation is simulated and the calculated efficiency factor 166 is less than the first simulated candidate operation, all of the candidate operations which have respective candidate locations 410 at previous locations 500 are removed from the population 168.

Figure 6:
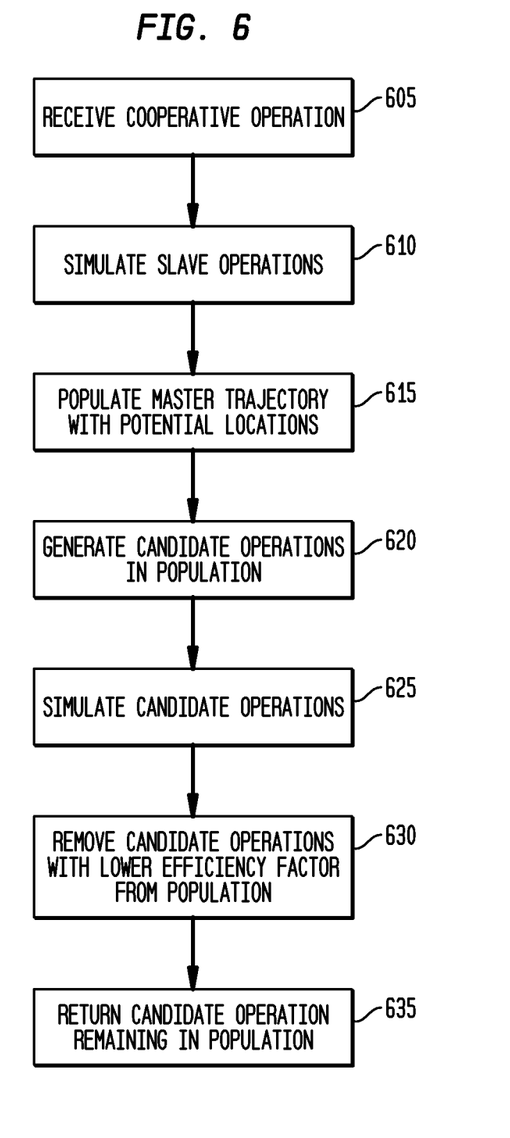
FIG. 6 illustrates a flowchart of a process for automatic and efficient location generation for cooperative motion in accordance with disclosed embodiments.

FIG. 6 illustrates a flowchart of a process for automatic and efficient location generation for cooperative motion in accordance with disclosed embodiments.

In step 605, the system receives a cooperative operation. The system receives a cooperative operation comprising a master operation performed by a master robot and at least one slave operation performed by a respective number of slave robots. The master operation comprises a master trajectory, a start location and an end location. A slave operation comprises a slave trajectory and a plurality of slave locations.

In step 610, the system simulates the slave operation. The system simulates the slave operations to obtain a slave duration between consecutive slave locations and a trajectory time to perform all of the at least one slave operations.

In step 615, the system populates the master trajectory with potential locations. The system populates a plurality of potential locations along the master trajectory. The system populates the potential locations along the master trajectory spacing the potential locations based on a delta value. The delta value can be based, for example, on a percentage, a number of the plurality of potential locations, or defined by the cooperative operation or a user.

In step 620, the system generates the candidate operations in the population. The system generates a plurality of candidate operations in a population. Each of the plurality of candidate operations comprises a number of candidate locations at the potential locations on the master trajectory equal to the difference between a number of locations in the master operation and the plurality of slave locations. The start location and the end location can be included in the number of master locations.

For each of the plurality of candidate operations in the population, the system performs steps 625 and 630. The system selection of candidate locations can be performed by any method to simulate all the candidate operations including in order by candidate operation generated, candidate operation order. In certain embodiments, optimized selections include dividing the slave duration between consecutive slave locations by the trajectory time and selecting the candidate operation with respective candidate locations at the potential locations with a respective ratio of candidate duration by the motion time.

In step 625, the system simulates the candidate operations. The system simulates a candidate operation with the at least one slave operations to calculate an efficiency factor to perform the candidate operation.

In step 630, the system removes the candidate operations with lower efficiency factor the population. The system can remove the candidate operation from the population when the efficiency factor is not better compared to other candidate operations in the population. The system can remove a candidate operation when the candidate duration between consecutive candidate locations exceeds the slave duration between respective consecutive slave locations. The system can remove a candidate operation when a collision is detected between the master robot and any of the at least one slave robots.

When the candidate operation removed comprises a previous location, removing all of the candidate operations that include the removed candidate location on previous potential locations. When the candidate operation removed comprises a following location, removing all of the candidate operations that include the removed candidate location on following potential locations.

In step 635, the system returns the candidate operation remaining in the population.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for automatic and efficient location generation for cooperative motion, the method performed by a data processing system and comprising:
    receiving a cooperative operation comprising a master operation performed by a master robot and a slave operation performed by a slave robot, wherein the master operation comprises a master trajectory, a start location and an end location, and wherein the slave operation comprises a slave trajectory and a plurality of slave locations;
    simulating the slave operation to obtain a slave duration between consecutive slave locations and a trajectory time to perform the slave operation;
    populating a plurality of potential locations along the master trajectory;
    generating a plurality of candidate operations in a population, wherein each of the plurality of candidate operations comprises a number of candidate locations at the potential locations on the master trajectory equal to the difference between a number of locations in the master operation and the plurality of slave locations;
    for each of the plurality of candidate operations in the population:
    simulating a candidate operation with the slave operation to calculate an efficiency factor to perform the candidate operation;
    removing the candidate operation from the population when the efficiency factor is not better as compared to other candidate operations in the population; and
    operating the master robot and the slave robot using the candidate operation remaining in the population.

2. The method of claim 1, wherein removing the candidate operation from the population when the efficiency factor is not better compared to the efficiency factor of the other candidate operations in the population further comprises:
    when the candidate operation removed comprises a previous location, removing all of the candidate operations that include the removed candidate location on the previous location; and
    when the candidate operation removed comprises a following location, removing all of the candidate operations that include the removed candidate location on the following location.

3. The method of claim 1 further comprising:
    removing the candidate operation when a candidate duration between consecutive candidate locations exceeds the slave duration between respective consecutive slave locations.

4. The method of claim 1, wherein populating the plurality of potential locations along the master trajectory comprises spacing the plurality of potential locations using a delta value, and wherein the delta value is based on a percentage, a number of the plurality of potential locations, or defined by the cooperative operation or a user.

5. The method of claim 1, wherein the cooperative operation comprises a plurality of slave operations.

6. The method of claim 1, wherein the efficiency factor is based on a motion time and an energy consumption, and wherein the motion time is measured based on completing the cooperative operation.

7. The method of claim 1 further comprising:
    removing the candidate operation when a collision is detected between the master robot and the slave robot.

8. A data processing system comprising:
    a processor; and
    an accessible memory, the data processing system particularly configured to:
    receive a cooperative operation comprising a master operation performed by a master robot and a slave operation performed by a slave robot, wherein the master operation comprises a master trajectory, a start location and an end location, and wherein the slave operation comprises a slave trajectory and a plurality of slave locations;

simulate the slave operation to obtain a slave duration between consecutive slave locations and a trajectory time to perform the slave operation;

populate a plurality of potential locations along the master trajectory;

generate a plurality of candidate operations in a population, wherein each of the plurality of candidate operations comprises a number of candidate locations at the potential locations on the master trajectory equal to the difference between a number of locations in the master operation and the plurality of slave locations;

for each of the plurality of candidate operations in the population:

simulate a candidate operation with the slave operations to calculate an efficiency factor to perform the candidate operation;

remove the candidate operation from the population when the efficiency factor is not better as compared to other candidate operations in the population; and operate the master robot and the slave robot using the candidate operation remaining in the population.

9. The data processing system of claim 8, wherein to remove the candidate operation from the population when the efficiency factor is not better compared to the efficiency factor of the other candidate operations in the population further comprises:

when the candidate operation removed comprises a previous location, removing all of the candidate operations that include the removed candidate location on the previous location; and when the candidate operation removed comprises a following location, removing all of the candidate operations that include the removed candidate location on the following location.

10. The data processing system of claim 8, further comprising:

remove the candidate operation when a candidate duration between consecutive candidate locations exceeds the slave duration between respective consecutive slave locations.

11. The data processing system of claim 8, wherein to populate the plurality of potential locations along the master trajectory comprises spacing the plurality of potential locations using a delta value, and wherein the delta value is based on a percentage, a number of the plurality of potential locations, or defined by the cooperative operation or a user.

12. The data processing system of claim 8, wherein the cooperative operation comprises a plurality of slave operations.

13. The data processing system of claim 8, wherein the efficiency factor is based on a motion time and an energy consumption, and wherein the motion time is measured based on completing the cooperative operation.

14. The data processing system of claim 8, further comprising:

remove the candidate operation when a collision is detected between the master robot and the slave robot.

15. A non-transitory computer-readable medium encoded with executable instructions that, when executed, cause one or more data processing systems to:

receive a cooperative operation comprising a master operation performed by a master robot and a slave operation performed by a slave robot, wherein the master operation comprises a master trajectory, a start location and an end location, and wherein the slave operation comprises a slave trajectory and a plurality of slave locations;

simulate the slave operation to obtain a slave duration between consecutive slave locations and a trajectory time to perform the slave operation;

populate a plurality of potential locations along the master trajectory;

generate a plurality of candidate operations in a population, wherein each of the plurality of candidate operations comprises a number of candidate locations at the potential locations on the master trajectory equal to the difference between a number of locations in the master operation and the plurality of slave locations;

for each of the plurality of candidate operations in the population:

simulate a candidate operation with the slave operation to calculate an efficiency factor to perform the candidate operation;

remove the candidate operation from the population when the efficiency factor is not better as compared to other candidate operations in the population; and operate the master robot and the slave robot using the candidate operation remaining in the population.

16. The computer-readable medium of claim 15, wherein to remove the candidate operation from the population when the efficiency factor is not better compared to the efficiency factor of the other candidate operations in the population further comprises:

when the candidate operation removed comprises a previous location, removing all of the candidate operations that include the removed candidate location on the previous potential location; and when the candidate operation removed comprises a following location, removing all of the candidate operations that include the removed candidate location on the following potential location.

17. The computer-readable medium of claim 15 further comprising:

remove the candidate operation when a candidate duration between consecutive candidate locations exceeds the slave duration between respective consecutive slave locations.

18. The computer-readable medium of claim 15, wherein to populate the plurality of potential locations along the master trajectory comprises spacing the plurality of potential locations using a delta value, and wherein the delta value is based on a percentage, a number of the plurality of potential locations, or defined by the cooperative operation or a user.

19. The computer-readable medium of claim 15, wherein the cooperative operation comprises a plurality of slave operations.

20. The computer-readable medium of claim 15, wherein the efficiency factor is based on a motion time and an energy consumption, and wherein the motion time is measured based on completing the cooperative operation.

* * * * *